United States Patent
Kalb

(10) Patent No.: US 12,410,981 B2
(45) Date of Patent: Sep. 9, 2025

(54) ADDITIVE MANUFACTURING ENHANCED SIDEARM

(71) Applicant: U.S. Army DEVCOM, Army Research Laboratory

(72) Inventor: Alan Kalb, Beachwood, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1 day.

(21) Appl. No.: 18/367,556

(22) Filed: Sep. 13, 2023

(65) Prior Publication Data

US 2025/0085073 A1    Mar. 13, 2025

(51) Int. Cl.
*F41A 21/06* (2006.01)
*F41A 21/48* (2006.01)
*F41C 3/00* (2006.01)
*F42C 11/00* (2006.01)
*B33Y 80/00* (2015.01)

(52) U.S. Cl.
CPC ............ *F41A 21/06* (2013.01); *F41A 21/488* (2013.01); *F41C 3/00* (2013.01); *F42C 11/008* (2013.01); *B33Y 80/00* (2014.12)

(58) Field of Classification Search
CPC .......... F41A 19/58; F41A 19/60; F41A 21/06; F41A 21/488; F41C 3/00
See application file for complete search history.

(56) References Cited

U.S. PATENT DOCUMENTS

| | | | | |
|---|---|---|---|---|
| 3,854,231 A | * | 12/1974 | Broyles | F42B 12/58 |
| | | | | 102/501 |
| 6,357,157 B1 | * | 3/2002 | Constant | F41A 19/58 |
| | | | | 42/84 |
| D670,351 S | * | 11/2012 | Skaggs, Sr. | D22/108 |
| 2024/0102776 A1 | * | 3/2024 | Baps | F42B 5/26 |

* cited by examiner

*Primary Examiner* — J. Woodrow Eldred
(74) *Attorney, Agent, or Firm* — Alan I. Kalb

(57) ABSTRACT

An additive manufactured enhanced sidearm comprising an ejectable barrel group assembly having two barrels, each with a chamber, in an under and over configuration thereby forming a top and bottom, and preloaded with keyed rounds having a series wherein each of said projectiles is keyed via a keyway in a chamber in said barrel, each of said projectiles in said barrel group are keyed having 0 to 4 keyways formed in the side of the projectile said projectiles having a propellant and primer means disposed behind said projectile in said chamber, a series of electrical contacts disposed within said chambers in communication with said primer means, a rail disposed at the bottom of the barrels with a locking notch means, a battery disposed with said ejectable barrel group, a grip assembly in communication with said ejectable barrel group assembly said grip assembly comprising a hand grip, a pc board disposed within said hand grip, a trigger group disposed upon said pc board, a high voltage generator circuit disposed on said pc board, at least one recoil plate assembly disposed upon said pc board, at least one microprocessor disposed upon said pc board, and a removable safety block that interferes with the batter to pc board connection.

3 Claims, 6 Drawing Sheets

ADDITIVE MANUFACTURING ENHANCED SIDEARM

GOVERNMENT INTEREST

The embodiments described herein may be manufactured, used, and/or licensed by or for the United States Government without the payment of royalties thereon.

BACKGROUND

Technical Field

The embodiments herein generally relate to a side arm and more particularly to a unique sidearm created using additive manufacturing materials and techniques.

Description of the Related Art

Conventional firearms for the military are manufactured years before they are ever issued to soldiers who will be using them. These firearms are made in highly specialized factories. When the military deploys to a conflict they must bring their equipment, including weapons, with them or have it shipped to them. With regard to sidearms in particular, it is common that the number of sidearms required by any unit be it a brigade or otherwise is not the number that is usually available on hand. This leads to officers including colonels and general staff being required to carry bulky M4 carbines or similar rifles in theatre when a sidearm would be sufficient for personal defense.

Additive manufacturing technology has seen amazing growth and improvement over the past decades. While various components of firearms can be manufactured utilizing additive manufacturing techniques, conventional sidearm designs do not lend themselves to a high degree of additive manufacturing. Moving components such as slides and springs along with ammunition do not lend themselves to additive manufacturing processes and techniques. Similarly, designs that could lend themselves to additive manufacturing, such as designs where projectiles and propellent are pre-stacked in the barrel of the weapon have been found to be unsuitable due to their low projectile velocity and lack of lethality as compared to conventional modern firearms. One recent failed concept was known as Metal Storm Limited (MSL). The company used the technology of electronic ignition and stacked projectiles. Unfortunately, the system was unable to obtain sufficient velocities for its projectiles to be competitive to that of modern conventional ammunition. The MSL system also suffered from mechanical and electrical unreliability issues as well as other problems. Throughout history various and sundry weapon related inventions have been created that superpose projectile load arrangement, i.e., stacking projectiles and propellants in the barrel. Some of these designs utilized multiple hammers that struck multiple primer caps in various orders. All of these weapons presented hazards and challenges to load as well as fire. Cocking the wrong hammer could end up firing the wrong charge causing damage to both the user and the weapon. The danger of a chain reaction that was caused by one round setting off the stack of rounds was a lingering fear whenever firing this type of weapon. Another issue was that of "cook offs" or a round would fire due to heat buildup in the barrel, this type of discharge of the weapon was spontaneous. All of these problems added to the list of disadvantages which prevented the idea from becoming popular even though the concept of the "superpose load", as it is often referred to in the art, in firearms existed for centuries.

There have been many attempts to circumvent the disadvantages cited above. One method was to use skirts around the projectile to prevent chain reaction ignition or detonation. While the "bullet skirt" may have solved one issue, that of chain reaction ignition, it did nothing for increasing the low velocity the projectiles suffered from nor did it prevent cook offs from parasitic heat conduction. The addition of electronics for firing the rounds improved reliability somewhat but did not address other issues especially the lack of velocity. Another issue was that the recoil from firing a round would cause compression of the rounds behind the round being fired. This type of compression could cause a detonation and other failures of the system. No solution has yet been proffered to solve all the problems until now.

SUMMARY

In view of the foregoing, an embodiment herein provides an additive manufacturing enhanced sidearm (AMES) comprising a firearm having an eject-able barrel assembly that incorporates a battery and two barrels in and "under and over" configuration as is commonly known in the art, said barrels containing a plurality of keyed projectiles housed in ceramic like material coated ledged chambers, propellant charges, primers and electronic means for ignition of said primers, said barrel assembly in communication with a grip assembly. The barrel assembly, in at least one embodiment are 3d printed, are formed from metal and are incased in a 3d printed housing. The chamber portion that holds the rounds is coated with a ceramic or ceramic-like material to prevent heat conduction. The frame assembly contains a locking feature to capture said barrel assembly, an unlocking and ejecting feature to hold securely and eject said barrel assembly, a recoil plate assembly to absorb the recoil transferred during firing from the barrel assembly and in communication with the barrel assembly during firing, and electronic means to electronically communicate with said barrel assembly, the frame assembly being powered by a battery disposed within the barrel assembly. In at least one embodiment of the present invention the locking and ejecting features are 3D printed compliant mechanisms, printed in place without the further addition of other parts. In other embodiments of the present invention conventional linkages and springs or a mix of conventional and compliant mechanisms are used for the barrel locking and ejecting features.

The frame assembly is 3D printed along with the grips while a circuit board and trigger group is sandwiched between two 3d printed halves in communication with a recoil plugs, these assemblies are encased in a 3d printed grip housing. The circuit board and trigger group has a trigger assembly that has an articulated safety trigger, an electrical switch and a return spring along with a means for mounting said assembly to the circuit board. The trigger group being in communication with the circuit board. The recoil plate assemble is formed a of series of laminated steel plates stacked together, each of said steel plates having a plurality of apertures to accommodate the passthrough of electrical connectors between the frame assembly and the barrel assembly. Safety features of the present invention include but are not limited to a galvanometer or continuity tester means to provide continuity testing along with a pull tab activator safety that blocks the electrical contact from the battery to the circuit board to activate the gun and make the gun functional are incorporated into the present invention. Signals from the continuity tester are sent to the microprocessor and displayed via an LED or through a holographic reflex sight. A backup hand crank generator is also integrated with a set of capacitors for emergency firing should the battery fail. In at least one embodiment a piezo electric generation system is used in case the battery fails. A "Glock" type trigger safety, as is commonly known in the art, is also incorporated into the present invention as part of the trigger group along with at least one LED that is in communication with the microprocessor assembly in order to show the readiness of the weapon. The LED may use bit angle modulation to display a variety of colors that may not be standard to a typical red/green LED.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
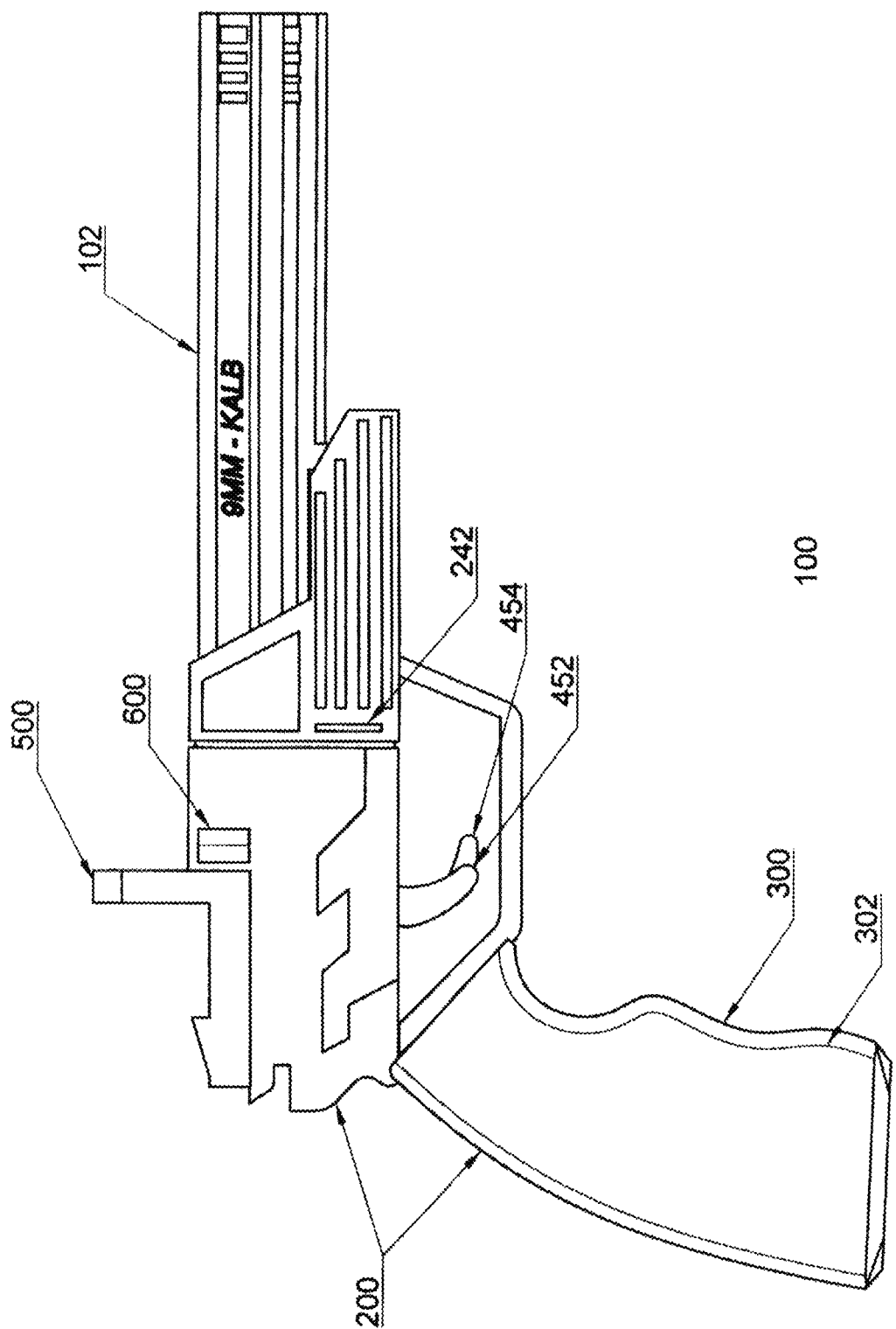
FIG. 1 illustrates a side view of an additive manufacturing enhanced sidearm, according to an embodiment herein.

An additive manufacturing enhanced sidearm 100 (hereinafter referred to as AMES) is shown in FIG. 1 in a side view. It will aid the viewer to look at FIGS. 1 and 2 simultaneously. A grip assembly 300 and a barrel assembly 102 are shown connected to a frame assembly 200. A holographic reflex sight 500 is attached to the frame assembly 200 as well. LED indicator(s) 600 are also shown mounted to the frame assembly 200. Finally, the trigger 452 and trigger safety 454 are also shown connected to the frame assembly 200.

Figure 2:
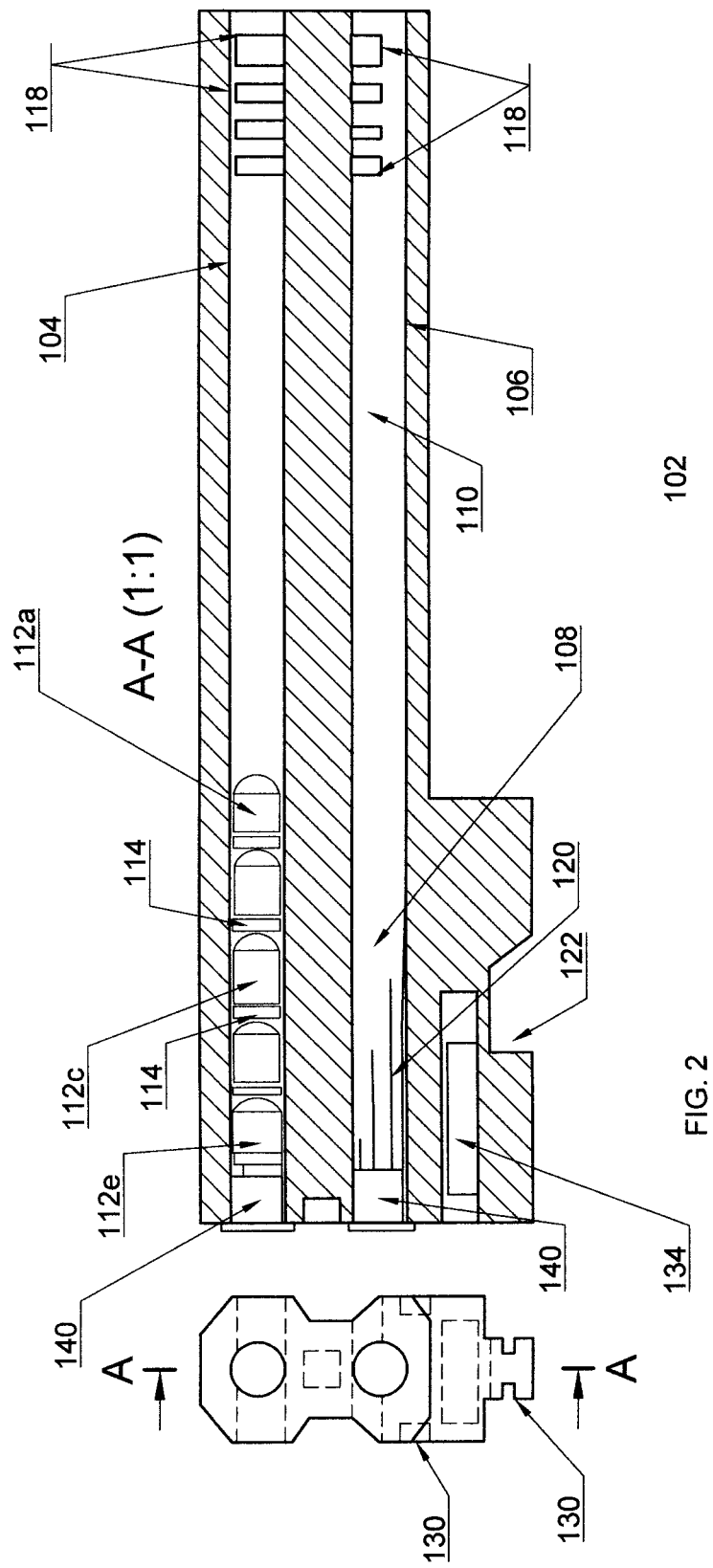
FIG. 2 illustrates a cross section view of the barrel assembly of additive manufacturing enhanced sidearm of FIG. 1, according to an embodiment herein.

The assembly 100 and includes a barrel assembly 102 that includes two barrels 104 and 106 respectively (not depicted in FIG. 1 for clarity but shown in FIG. 2). These barrels feature a plurality of compensating apertures 118 (shown in FIG. 2). Each barrel 104 and 106 includes a rifled portion 110 and a chamber portion 108. In at least one embodiment the rifled portion 110 and the chambered portion 108 are formed from one steel tubular cylinder. The inventor contemplates other embodiments wherein the barrels 104 and 106, have separately formed chambers 108 and rifled portions 110 that are coupled to each other after forming. The inventor contemplates that the chamber portions 108 could be coupled to the rifled portions 110 via threading, welding and many other techniques known to those skilled in the art of joining metal tubular structures. Similarly, the inventor contemplates that the barrels 104 and 106, both rifle 110 and chamber portions 108 whether formed separately or as one could be formed via metal 3*d* printing, including but not limited to powder 3*d* sintering and other methods known to those skilled in the art. A slot 242 is provided for the safety pull tab activator 240 shown in FIG. 5

Figure 6:
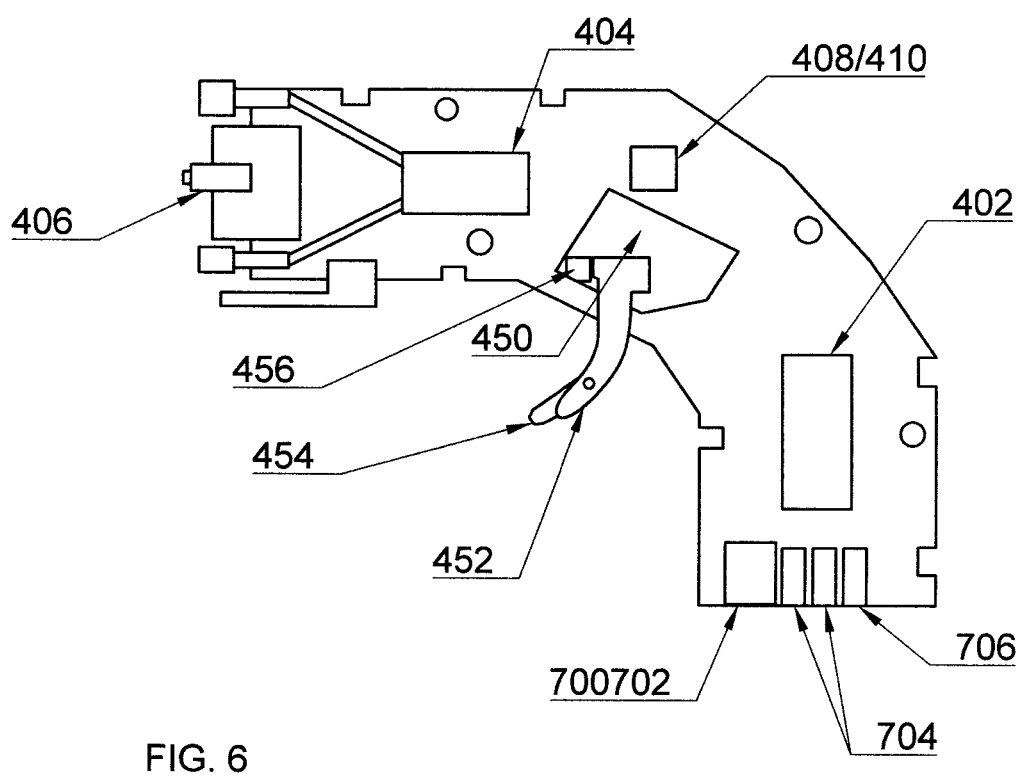
FIG. 6 illustrates a top view of a circuit board of an additive manufacturing enhanced sidearm of FIG. 1, according to an embodiment herein.

An integrated holographic reflex sight 500 commonly known in the art is also provided as part of the system 100, the sight 500 is unique since it is integrated into the microprocessor shown in FIG. 6. The sight 500 itself is not 3d printed. The sight 500 is connected to the microprocessor 402 of the AMES 100 and actively moves the projected point of impact based on which barrel 104 and 106 is selected for firing thus ensuring that the current point of projectile impact is being correctly depicted in the sight 500. It is further contemplated by the inventor that the projectiles 112, propellant 114, primers 116 and associated electrical contacts 120 are printed in place utilizing advanced additive manufacturing.

Within said barrels 104 and 106 is disposed a series of recoil compensating apertures 118, this is commonly referred to as an integral compensator 118 and each barrel 104 and 106 may have one set of these 118. The inventor contemplates the present invention with and without this feature 118. The inventor contemplates the integral compensator 118 can be formed in literally dozens of configurations including the one as shown in the drawings or a multitude of arrangements not shown but also known to those skilled in the art. Recoil compensators often colloquially referred to as "comps" have been known for a very long time and employed in both rifles and pistols for the purpose of reducing felt recoil to the user. A set of rails 130 is incorporated in the barrel design 102 to facilitate the sliding and locking of the barrel assembly 102 into the frame assembly 200. A notch feature 122 in the rail 130 allows for the engagement of a locking mechanism 220 in the frame 200 to secure the barrel assembly 102 to the frame assembly 200.

Figure 3:
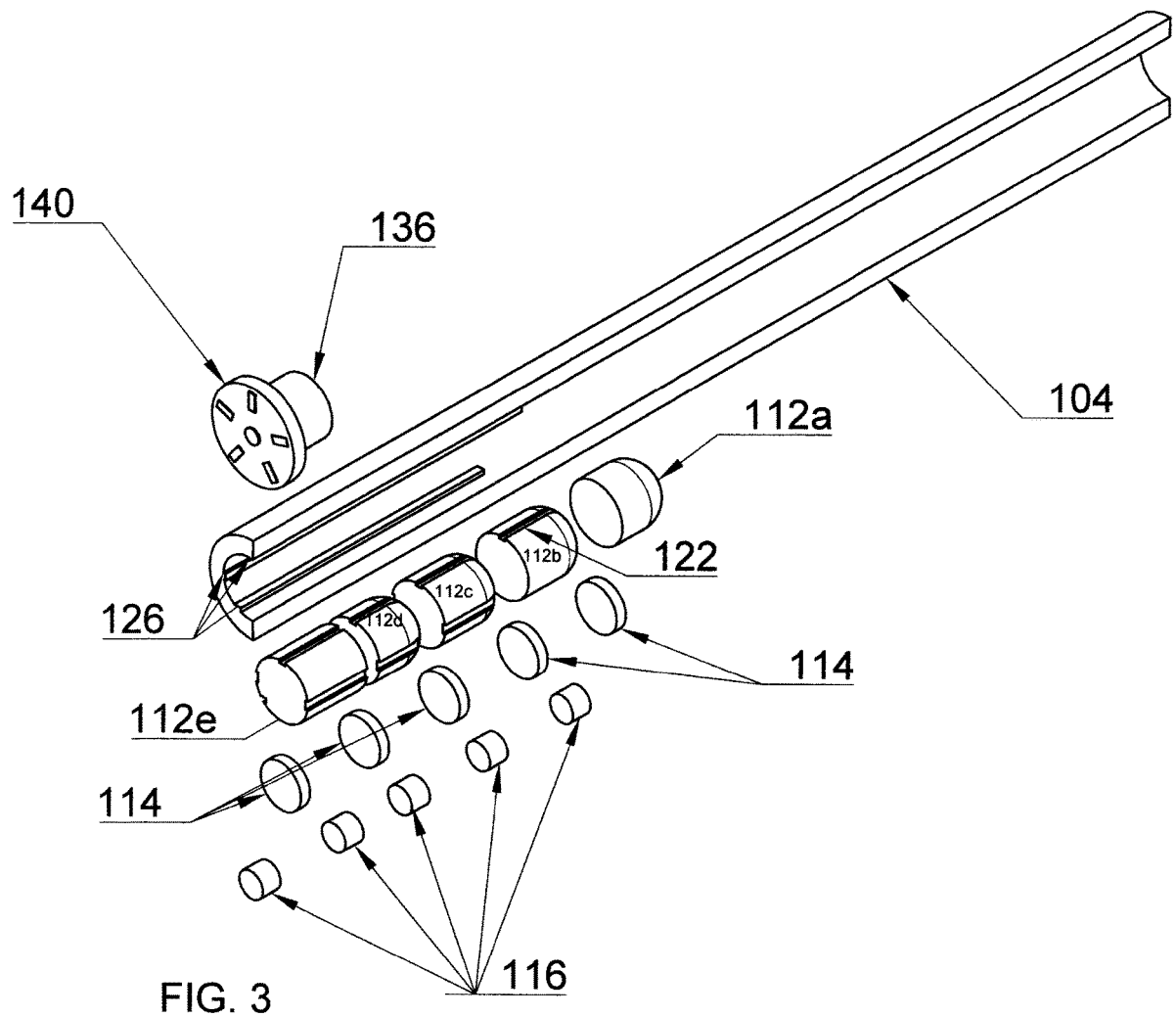
FIG. 3 illustrates an exploded cut away view of one of the barrels of the barrel assembly of an additive manufacturing enhanced sidearm of FIG. 1, according to an embodiment herein.

Referring to FIGS. 2 and 3 or a series of keyed and stacked projectiles 112 a through 112 E for barrel 104 and 111 A through 111 E for barrel 106 respectively. The projectiles in each barrel 104 and 106 are labeled 1 through 5 in FIG. 2. The first projectile 112 is disposed closest to the rifling 110 and the last projectile being disposed proximate to the barrel recoil plug 140. Each projectile sits on a ledge portion 126 or flying buttress, herein after referred to as "ledge" that juts out from the inside wall 124 of the barrel.

Figure 4:
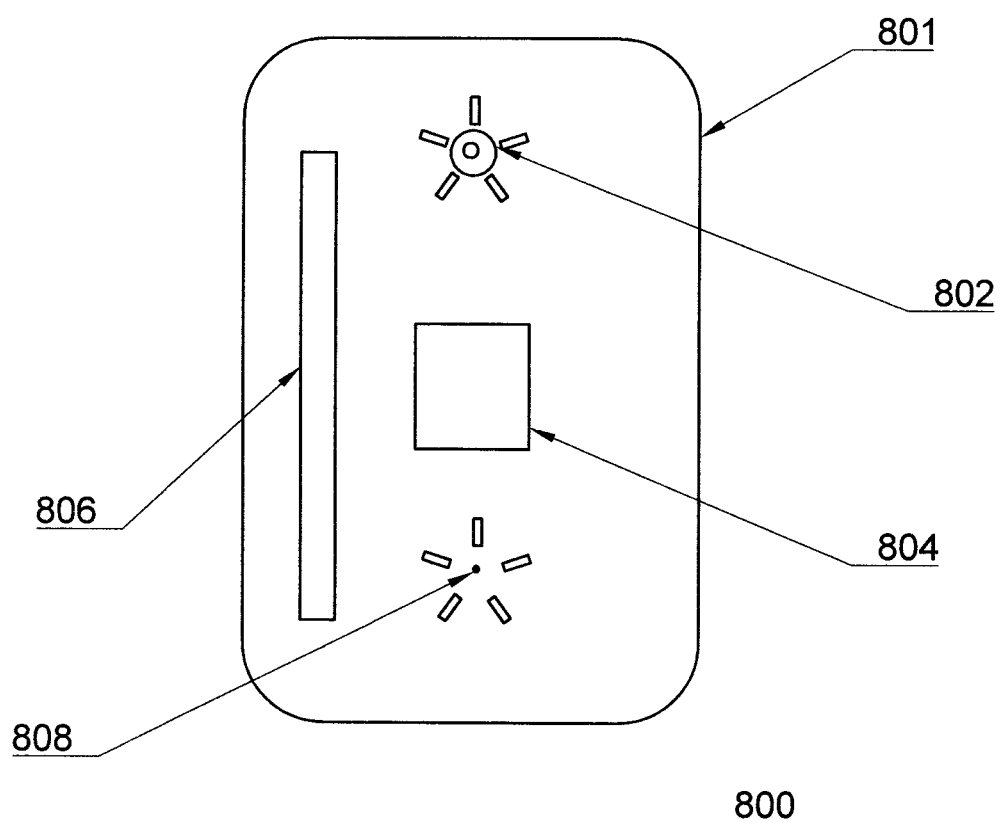
FIG. 4 illustrates a front view of the recoil plate assembly of an additive manufacturing enhanced sidearm of FIG. 1, according to an embodiment herein.

The chamber 108 is coated with a ceramic like material to prevent parasitic heat conduction. There are five ledges 126 in each barrel 104 and 106 one to support each projectile 112 respectively. Projectiles 112b through 112e will have key ways 128, hereinafter referred to as "keys" 128 formed in them to clear and move past the ledges 126 directly in front of them. The ledge 126 prevents the projectiles 112 et al., in the stack from moving rearward when the recoil force of an initiated projectile 112 acts upon it during firing. As a round is fired the projectile 112 moves forward engaging the rifled portion 110 of the barrel 104 and 106 to impart spin to the projectile 112 and then leaves the barrel assembly 102 with great velocity. The next round 112 is then selected by the microprocessor 402 and awaits initiation by a trigger 452 pull. During firing, the rearward force from the projectile 112 moving in the opposite direction acts against the remaining projectiles 112 in the chamber portion 108 of the barrel 104 and 106 and attempts to force them rearward. The rearward motion of the projectile 112 in the chamber 108 is arrested by the ledge 126. This force is transferred to the barrel assembly 102 via the ledge 126 and in turn to the recoil plate 800 and the frame assembly 200, felt recoil is reduced via the integral compensators 118 the resulting reduced recoil is then transferred to the hand of the user (not shown). FIG. 4 shows the front view of the recoil plate assembly 800. The plate 801 houses a slot 806 for mechanically connecting the circuit board 400. Also shown are the positive firing contacts 802, the barrel ejector aperture 804 and the negative firing contact 808.

Propellent charges 114 through are also shown. Within these barrels 102 are the series of electrical traces 120 that extend along the inside of the barrels 104 and 106. Each of said traces 120 being in communication within individual primer 116 and terminating at a barrel recoil plug 140 disposed at the rear end portion of the barrel 104 and 106. Electrical traces 120 are bonded to the interior chamber portion wall 124 using an insulating nonconductive adhesive (not shown), such adhesives are commonly known in the art.

A plurality of electrical traces 120 is disposed longitudinally within each barrel chamber 108 section and parallel to each other. Each trace 120 conducts electricity while being electrically insulated from the metal barrel 104 wall and other traces 120. Each trace 120 extends from the barrel recoil plug 140 located at the rear of the barrel 104 to a specified projectile 112. The electrical traces 120 make contact with the projectiles 112 surface. At least a portion of the surface of the projectile 112 is electrically conductive. Conductivity can be provided by a conductive coating including but not limited to any conductive material such as copper electroplating, jacketing, paint, powder coating, printing, etc., conductive materials being well known in the art the inventor contemplates many different elements as well as alloys being used for this purpose. Within the tip of the second through fifth projectiles 112 is an electrically initiated primer 116. Note that the primer 116 can be initiated by low voltage in at least one embodiment and high voltage induced plasma in at least another embodiment. The electrical trace 120 carries a positive electrical charge to the primer 116 when the AMES 100 is fired a negative lead 132 is also in contact with the primer 116 such that a primer 116 can be initiated when the trigger 452 is pulled and the circuit is completed. The negative lead 132 is electrically insulated from positive electrical trace contacts 120. The inventor contemplates in at least one embodiment of the present invention a single negative lead 132 extending through the stack of projectiles 112, the projectiles 112 having a composite structure that allows the negative lead 132 to be insulated from the rest of the projectile 112.

Selection of the projectile 112 firing sequence is made by the microprocessor 402. The microprocessor 402 selects each projectile 122 to be fired. Upon the firing of a projectile 112 the next subsequent projectile 112 is selected for firing. Typical programming of the microprocessor 402 designates the top barrel 104 for firing followed by the bottom barrel 106. However, it is contemplated that this firing sequence can be changed by either the manufacturer or the user. Programming is facilitated via a port (not shown) located in the frame assembly 200. Firing sequences could be but are not limited to the following top/bottom; bottom/top; all top followed by all bottom; all bottom followed by all top and any and all combinations thereof. The microprocessor 402 can detect a failed around and can automatically switch to a different barrel 104 and 106 assuming there are still projectiles 112 in said alternate barrel 102 and 104. The integrated holographic reflex sight 500 that is slaved to the AMES system 100 detects and adjusts the appropriate point of impact depending on which barrel 104, 106 is selected.

FIG. 6 shows the trigger group 450 is comprised of a trigger 452 including a trigger safety tip 454 that is required to be actuated before the rest of the trigger 452 can be pulled. This form of trigger safety is commonly known in the art. A trigger switch 456 in communication with the trigger 452 and is activated by the pulling of the trigger 452 and associated hardware and linkage to secure said trigger 452 and switch 456 to the circuit board assembly 400. The electronic switch 456 sends a signal to the microprocessor 402 to fire the selected projectile 112 from the designated barrel 104,106.

Within the barrel assembly 102 is a battery 134 that powers the AMES 100. When a barrel assembly 102 is inserted into the frame assembly 200 and locked in place an electrical connection is formed, the battery 134 is now in communication with the microprocessor 402 and a high voltage generation circuit 404. By pulling the trigger 452 the user will activate an electrical switch 456 that actuates the firing circuit 404 and sends a high voltage current back to the barrel assembly 102. The current travels along the barrel 104, 106 via the barrel traces 120 from the recoil plate assembly 800 to the plug assembly 140 and finally to the assigned projectile 112 and its primer 116. When actuated the primer 116 detonates and initiates burning of the propellent mixture 114 that sends the projectile 112 out of the front end of the barrel 104, 106. FIG. 1 shows the caliber of the round "9 MM—KALB" it should be noted that the inventor contemplates the use of many different calibers and is not limited to one specific caliber. For the present invention the changes of calibers are as easy as changing barrel assemblies. Both powder propellant and solid propellant similar to that used in caseless ammunition is contemplated by the inventor for all embodiments of the present invention. The inventor contemplates that at least in one embodiment that the solid propellant will be deposited in place using advanced 3d additive manufacturing. A sealant (not shown) is used between each projectile 112 to prevent chain firing and cook-offs. The sealant acts as both a physical and thermal barrier between projectiles 112 and their associated propellants 114.

Inventor contemplates the use of both standard primers 116 or electrical fired primers 116 to initiate propellant 114 burn. Electrical primers 116 commonly available for "Remington E" rifles and other known are electric primers contemplated for use by this invention. The primers 116 are mounted in a hollow tip 113 of every subsequent projectile 112 following the first projectile 112 in the barrel 104, 106. The type of projectile for the first seated projectile closest to the rifling, previously referred to as "projectile 1" can be any type of standard projectile including but not limited to; full metal jacket, exposed soft point, hollow point, ballistic tip, etc. of course each barrel 104, 106 has its own "projectile 1". All subsequent projectiles 112 in the chamber portion 108 of the barrel 104, 106 must have a cavity 113 or other means for holding a primer 116 in electrical communication with the barrel assembly 102 that will initiate the projectile 112 in front of it. The last projectile 112 of each barrel 104, 106 is initiated by a primer 116 disposed in a primer plug 136; the primer plugs 136 is in communication with the barrel recoil plug 140. Said primer plug 136 being disposed in or in front of the barrel recoil plug 140. The inventor envisions many embodiments where the primer plugs 136 and its associated primer 116 are separately attached or integral to the barrel recoil plug 140.

The barrel recoil plugs 140 being in communication with a recoil plate assembly 800, both physically and electronically, the recoil plate assembly 800 transfers the recoil from the barrel assembly 102 to the frame assembly 200 after a primer 116 has been detonated, the signals having passed from the recoil plate 800 to the connector plug 140 then to the firing contact 802. Hereinafter referred to as the firing contacts 802. More specifically, when the barrel assembly 102 is locked into the frame assembly 200 the firing contracts 802 are in communication with the barrel connector plug 140. Electricity is provided to the frame assembly 200 via a rechargeable battery 134 housed in the barrel assembly 102. Battery 134 types for use in its invention include but are not limited to lithium, lithium polymer, cadmium; lead acid, etc. A plurality of triangular shaped spring-loaded electrical contacts 138 at the bottom of the battery 134 mate up with matching contacts 238 in the frame assembly 200 and are held in communication via a locking mechanism 202 that holds the barrel assembly 102 to the frame assembly 200.

Figure 5:
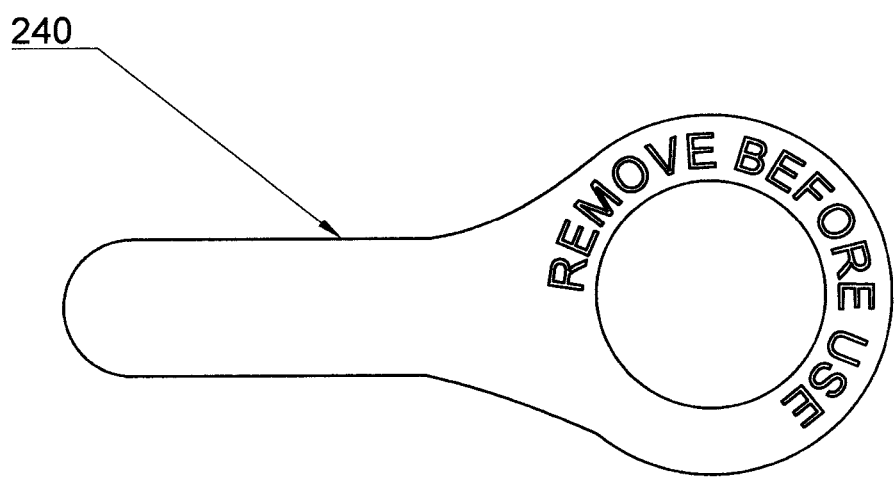
FIG. 5 illustrates a pull tab activator of an additive manufacturing enhanced sidearm of FIG. 1, according to an embodiment herein.

In at least one embodiment, an emergency crank generator 700 is integrated to the frame assembly 200 and can be used to power up and energize at least one capacitor 704 in communication with the hand crank 700 and the circuit board 400 of the AMES 100. In yet another embodiment a piezo electric generator 702 is used to generate electrical means for powering the AMES 100 and initiating the primers 116 to fire the weapon. A safety tab interrupt 240, shown more clearly in FIG. 5, is located in between the batteries contact 138 and the frame contact 238 of the barrel assembly 102 whereby a piece of non-conductive material prevents electrical communication between the barrel assembly 102 and the frame assembly 200 a slot 242 shown in FIG. 1 allows for tab 240 to be sandwiched between the battery 134 and the frame 200. The safety tab 240 is removed by the user prior to firing of the AMES 100. Inventor envisions at least one embodiment where the safety interrupt tab 240 is connected to both the user's holster and the AMES 100 such that the removal of weapon from the holster pulls the tab 240 out of the weapon thus activating it for firing.

FIG. 6 shows the circuit board assembly 400 has at least one microprocessor 402, a high voltage circuit 404, a trigger switch assembly 450, barrel ejecting means 406, emergency crank generator 700 or piezo generator 702 and associated electronics 706 and capacitor 704 or capacitors, a galvanometer circuit 408 and continuity tester 410 and mechanical securing means for fastening the circuit board assembly 400 to the frame assembly 200 and the left 302 and right grips 304 of the AMES 100. The circuit board assembly 400 and associated electronic components are the only portion of the AMES 100 along with the holographic reflex sight 500 that are not contemplated as being 3d printed. The inventor envisions that the circuit board assembly 400 will be fabricated prior to the other assemblies and stored awaiting shipment to areas around the world where and when needed by the military. The barrel ejector 406 is contemplated as being affixed to the circuit board 400. When the lock 220 is actuated to unlock, the barrel ejector 406 ejects the barrel assembly 102. In the embodiment depicted, the illustration shows a spring-loaded ejector 406 that protrudes through the recoil plate assembly 800 to contact and force the barrel assembly 102 out of the frame assembly 200 when actuated.

FIG. 1 shows at least one lowlight LED 600 is disposed within the frame assembly 200. The LED is connected to the circuit board 400. The LED 600 is visible to the user by being disposed below the surface of the frame assembly 200 such that the LED 600 is visible to the user while aiming the AMES 100. Because of the low illumination and the placement of the LED 600, the LED 600 is only visible from a limited angle of sight thus preventing the light from being seen from other angles and potentially giving away the user's position in the low light or dark conditions. In one embodiment a red LED 600 indicates a malfunction, while a yellow LED 600 indicates low battery and a green LED 600 indicates the AMES 100 is working properly. Different colors can be created by bit angle modulation to indicate the condition of the AMES 100 thus reducing the need for multiple or special LEDs. Various modes of blinking may be used to indicate other conditions including but not limited to rounds remaining, condition of the galvanometer 408 or continuity circuit 410. While these conditions may be simultaneously displayed on the holographic reflex 500 type sight, the LED 600 acts as a backup should the sight 500 be damaged, destroyed or otherwise rendered inoperative.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It should be appreciated that the various combinations of the features described herein may be adjusted in size and applied either serially, in parallel, or in combinations of serial and parallel configurations. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

I claim:

1. An additive manufacturing enhanced sidearm comprising:
    an ejectable barrel group assembly having two barrels, each with a chamber, in an under and over configuration thereby forming a top and bottom, and preloaded with keyed rounds each having a series of circumferential keyways,
    wherein each of said projectiles is keyed via a keyway in a chamber in said barrel,
    each of said projectiles in said barrel group is keyed having 0 to 4 keyways formed in the side of the projectile, said projectiles having a propellant and primer means disposed behind said projectile in said chamber, a series of electrical contacts disposed within said chambers in communication with said primer means, a rail disposed at the bottom of the barrels with a locking notch means, a battery disposed within said ejectable barrel group, a grip assembly in communication with said ejectable barrel group assembly, said grip assembly comprising:
- a hand grip,
- a circuit board disposed within said hand grip,
- a trigger group disposed upon said circuit board,
- a high voltage generator circuit disposed on said circuit board,
- at least one recoil plate assembly disposed upon said circuit board,
- at least one microprocessor disposed upon said circuit board, and
- a removable safety block that interferes with the battery-to-circuit board connection.

2. The additive manufactured enhanced sidearm of claim 1, wherein said projectiles further comprise a negative electric conductor that is disposed through the center of all of the projectiles and is in communication with all of the projectiles.

3. The additive manufactured enhanced sidearm of claim 1, wherein said primers are disposed within a cavity of the immediately preceding projectile forming a stack,
said stack excluding a first projectile which has no need for a primer,
and wherein a final projectile is initiated by a primer located on a barrel recoil primer plug disposed at the rear end of the barrel.

* * * * *